UNITED STATES PATENT OFFICE.

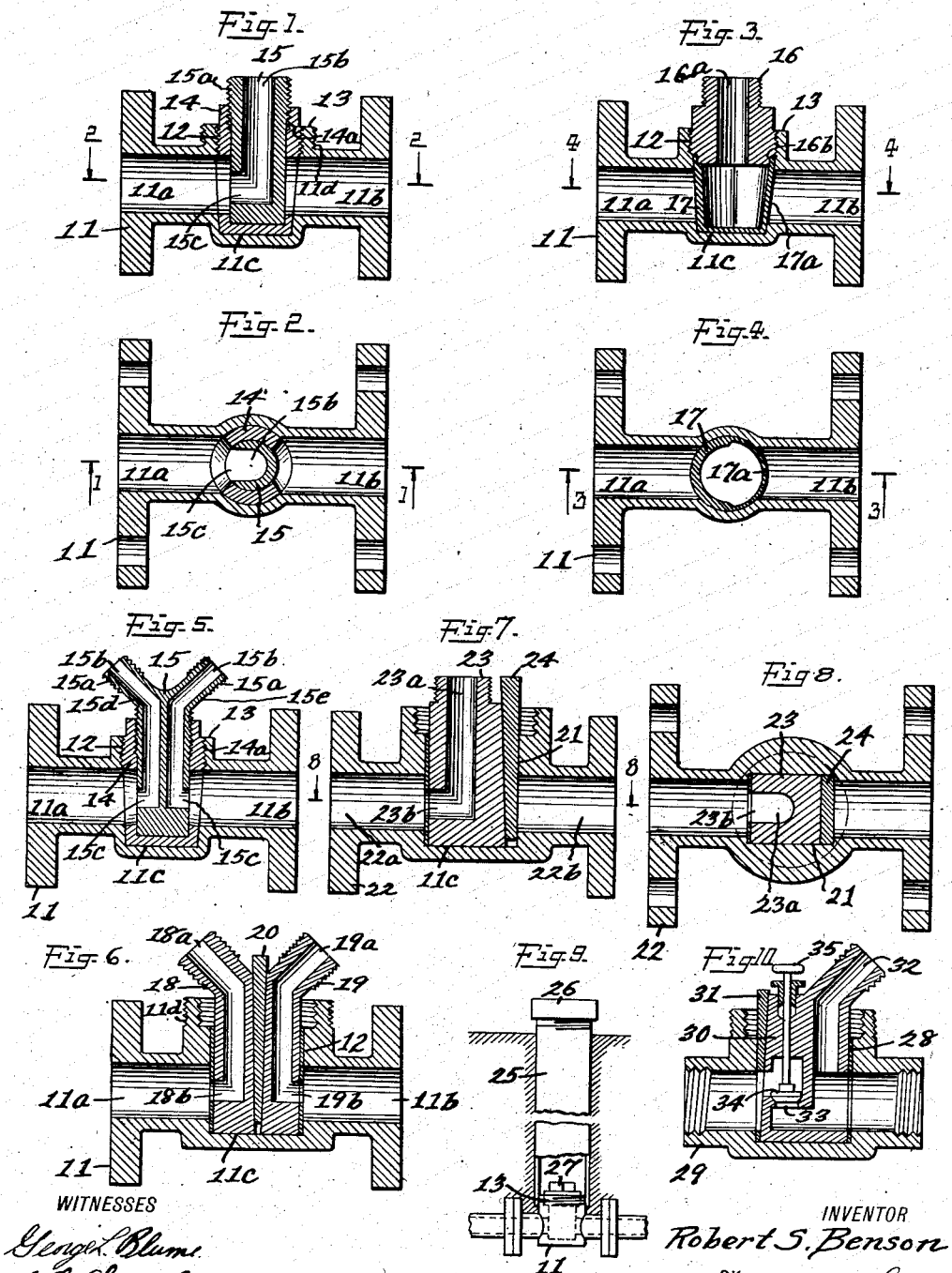
R. S. BENSON.
TEST PLUG.
APPLICATION FILED JAN. 24, 1916.
1,212,886. Patented Jan. 16, 1917.

ROBERT SANFORD BENSON, OF WEST PARIS, MAINE.

TEST-PLUG.

1,212,886.   Specification of Letters Patent.   Patented Jan. 16, 1917.

Application filed January 24, 1916. Serial No. 73,891.

*To all whom it may concern:*

Be it known that I, ROBERT S. BENSON, a citizen of the United States, and a resident of West Paris, in the county of Oxford and State of Maine, have invented certain new and useful Improvements in Test-Plugs, of which the following is a specification.

My invention relates to pipe lines of various kinds and classes, and the main object thereof is to provide means installed at various points in such a line, or in sections thereof, for facilitating the cleaning of such lines, testing for leaks, and the like.

My invention is fully described in the following specification, of which the accompanying drawings form a part, in which like characters refer to like parts in each of the views, and in which:—

Figure 1 is a section taken through one embodiment of my invention, on the line 1—1 of Fig. 2; Fig. 2 is a section taken on the line 2—2 of Fig. 1; Fig. 3 is a section taken through a modification, on the line 3—3 of Fig. 4; Fig. 4 is a section taken on the line 4—4 of Fig. 3; Fig. 5 is a vertical section of another modification; Fig. 6 is a vertical section of another modification; Fig. 7 is a vertical section of another modification; Fig. 8 is a section taken on the line 8—8 of Fig. 7; Fig. 9 is a view of an extension which I may employ for buried pipe lines; and Fig. 10 is a vertical section taken through still another modification.

In all the forms shown, the device includes a pipe coupling 11 forming a component and permanent part of a pipe line and having a port 12 at one side thereof in the manner of conventional T-couplings, and also includes a plug which may be of different forms but which is in all instances provided with a passage connecting either end of the passage through the coupling with the outer plug end which may be in turn connected with a pump for one of my devices and an adjacent device may have this outer plug end sealed when testing for leaks.

For pipe cleansing, the said adjacent device may be connected with a drain pipe, and this operation, as well as the testing operation, may be successively accomplished for each portion of the pipe line between the locations of my devices, whether on the main line or on branches, it being my intent to use a plurality of the devices suitably located.

The form shown in Figs. 1 and 2 shows the port 12 as internally screw threaded, or rather the flange 13 thereof, to engage a sleeve 14 in communication with both the ends $11^a$ and $11^b$ of the coupling 11, said sleeve being closed at its lower end and seated in a recess $11^c$ in the coupling and open at its top where it is provided with an internal screw thread $14^a$, and the flange 13 of the coupling is externally screw threaded, as shown at $11^d$, to engage a cap, not shown, when the coupling is used only as a portion of the pipe line.

Engaging the screw thread $14^a$ is a plug 15 externally threaded at $15^a$ for such engagement and for engagement with a pipe or hose, not shown, leading to a pump for one of the plugs and leading to a drain for an adjacent plug when the pipe line is being cleaned, or leading to a pump for one of the plugs and engaging a cap, not shown, for an adjacent plug when the device is being used as a test plug for a section of the pipe line.

The plug 15 is provided with a passage $15^b$ leading downwardly from the top to a point adjacent the lower end where it connects with a horizontal passage $15^c$ opening into one end of the coupling, $11^a$ in the arrangement shown and, when a section of the pipe line between two adjacent plugs is to be either cleaned or tested, the open ends of the passages $15^c$ face each other, the plugs being rotatably mounted in the respective sleeves in order to connect the passages $15^c$ thereof with either end of the respective couplings.

In the form shown in Figs. 3 and 4 the coupling 11 is similar to that described but instead of the sleeve and plug I provide a plug 16 threaded into the port 12 and rotatable therein, said plug having a passage $16^a$ extending downwardly therethrough and being reduced in diameter at its lower end to provide a seat $16^b$ for an imperforate cup 17 seated in the recess $11^c$ of the coupling and rotatable with the plug 16, one side of the cup 17 being weakened, as shown at $17^a$, whereby the cup wall will be punctured at this side by fluid under pressure, the weakened portions of the plug cups facing another when a section of pipe line therebetween is to be either cleaned or tested.

The form shown in Fig. 5 is essentially the same as that shown in Figs. 1 and 2 with the difference that I provide duplicate passages 15ᵇ and 15ᶜ in the plug 15 and each of which connects with an end 11ᵃ and 11ᵇ of the coupling, externally threaded branches 15ᵈ and 15ᵉ for engagement with pipes or hose lengths, not shown. This form is intended for use where it is not desirable to discontinue the supply of water or gas through the pipe line while a section thereof is being tested or cleaned as, for instance, if the pipe section on the 11ᵃ side of the coupling is being tested or cleaned, the branch 15ᵈ will lead to a pump for one of the plugs and will be open for cleaning and capped for testing on the adjacent plug but on the branch 15ᵉ of said last named plug, whereas the branch 15ᵉ of the first named plug may be connected, by a pipe or hose, with the branch 15ᵈ of the second plug beyond said last named plug, thereby cutting out only the section between two adjacent plugs and bridging the pipe line thereover.

The form shown in Fig. 6 is similar to that shown in Fig. 5 in principle and use, the structure differing in that I dispense with the sleeve 14 and form the plug of two similar members 18 and 19 having the passages 18ᵃ and 18ᵇ, and 19ᵃ and 19ᵇ therein, respectively, said members being locked in the coupling by means of a wedge 20 forced therebetween.

The form shown in Figs. 7 and 8 provides for an angular recess 21 in the coupling 22 for the reception of a plug 23 and a wedge 24, said plug having the passages 23ᵃ and 23ᵇ and being reversible in the recess for connection with either end 22ᵃ or 22ᵇ of the coupling, the use being the same as described with reference to Figs. 1 and 2.

In Fig. 9 I have shown an application of my invention to buried or submerged pipe lines, the flange 13 of the coupling 11 being surrounded by a tube 25 leading to the surface of the ground or water and provided with a cap 26 threaded on the top thereof, the coupling being shown as provided with a male plug 27 which may be removed when it is desired to insert any of the forms of plugs already described for testing or cleaning a section of the pipe line.

In Fig. 10 is shown a modified form similar to Figs. 6 and 7 with the difference that the recess 28 of the coupling 29 is normally larger than the recess 21 of the coupling 22 in Figs. 7 and 8 to receive a plug 30 and a wedge 31, the plug 30 having an outwardly directed passage 32 for use in the manner already described and having a supplemental passage 33 controlled by a valve 34 operable by means of a handle 35 exterior of the coupling and plug, said valve being closed when it is desired to clean a pipe line section and being opened for the normal flow through said pipe line.

As stated, the principle and use of all the forms are the same, to cut out a section of a pipe line for testing or cleaning, two of the forms, Figs. 5 and 8, contemplating means for permitting normal or partial flow of fluid while testing or cleaning a section by simply bridging the latter, and, while I have shown several forms of my invention, I do not limit myself thereto but may make changes thereover, providing that such changes are within the spirit of my invention and within the scope of the appended claims.

Having fully described my invention, what I claim as new, and desire to secure by Letters Patent, is:—

1. As an article of manufacture, for use in a pipe line at intervals, a coupling having a longitudinal passage therethrough and a port in the side thereof, a plug arranged laterally in said coupling and extended outwardly through said port, said plug having an axial passage extended inwardly from the outer end thereof and a transverse passage connecting said axial passage with one end of the longitudinal passage in said coupling, and means on the exterior end of said plug for connection with a pipe or hose.

2. As an article of manufacture, for use in a pipe line at intervals, a coupling having a longitudinal passage therethrough, a port in the side thereof, and a recess diametrically opposite said port, a plug seated in said recess and extended outwardly of said port, said plug having an axial passage extended inwardly from the outer end thereof and a transverse passage connecting said axial passage with one end of the longitudinal passage through said coupling, and means on the outer end of said plug for pipe or hose engagement.

3. As an article of manufacture, for use in a pipe line at intervals, a coupling having a longitudinal passage therethrough, a port in the side thereof, a flange around said port and a recess diametrically opposite said port, said flange being screw threaded, a plug seated in said recess and extended outwardly of said port, said plug having an axial passage extended inwardly from the outer end thereof and a transverse passage connecting said axial passage with one end of the longitudinal passage through said coupling, and means on the outer end of said plug for pipe or hose engagement.

4. As an article of manufacture, for use in a pipe line at intervals, a coupling having a longitudinal passage therethrough, a port in the side thereof, and a recess diametrically opposite said port, a ported sleeve seated in said recess and extended through said port, a plug in said sleeve having an axial passage extended from the outer end thereof and a transverse passage connecting said axial passage with a port in said sleeve and with one end of the longitudinal passage in said coupling, and means on the outer end of said plug for pipe or hose engagement.

5. As an article of manufacture, for use in a pipe line at intervals, a coupling having a longitudinal passage therethrough, a port in the side thereof, and an angular recess in the position of said port, an angular plug in said recess, a wedge for locking said plug in position, and means on the outer end of said plug for pipe or hose connection, said plug having an axial passage and a transverse passage connecting said axial passage with one end of the longitudinal passage through said coupling.

6. As an article of manufacture, for use in a pipe line at intervals, a coupling having a longitudinal passage therethrough, a port in the side thereof, and a recess diametrically opposite said port, a plug in said recess and extended through said port, and means on the outer end of said plug for pipe or hose connection, said plug having two axial passages from the outer end thereof terminating, each, in a transverse passage opening into the respective end of the longitudinal passage in said coupling.

7. As an article of manufacture, for use in a pipe line at intervals, a coupling having a longitudinal passage therethrough, a port in the side thereof, and an angular recess in the position of said port, an angular plug in said recess composed of two members and a wedge therebetween, and means on the outer end of said plug for pipe or hose connection, said members having, each, an axial passage and a transverse passage connecting said axial passage with one end of the longitudinal passage through said coupling.

8. As an article of manufacture, for use in a pipe line at intervals, a coupling having a longitudinal passage therethrough, a port at one side thereof, a flange around said port, and a recess diametrically opposite said port, a plug seated in said recess and extended outwardly of said port, means on the outer end of said plug for pipe or hose connection, and a tube provided with a removable cap held on said flange.

9. As an article of manufacture, for use in a pipe line at intervals, a coupling having a longitudinal passage therethrough, a valve controlling said passage, exterior means for actuating said valve, a tubular member extended from said coupling having a passage therethrough connected with one end of the passage through said coupling, and means on the outer end of said tubular member for pipe or hose connection.

In testimony whereof I have signed my name to this specification in the presence of two subscribing witnesses.

ROBERT SANFORD BENSON.

Witnesses:
JOSEPH W. CUMMINGS,
C. HOWARD LANE.